United States Patent Office 3,549,651
Patented Dec. 22, 1970

3,549,651
PROCESS OF ENHANCING THE CRYSTALLINE UNIFORMITY OF A LINEAR POLYAMIDE COMPOSITION AND THE POLYAMIDE COMPOSITION RESULTING FROM SAID PROCESS
Hendrikus J. Oswald and Annemarie C. Reimschuessel, Morristown, N.J., assignors to Allied Chemical Corporation, New York, N.Y., a corporation of New York
No Drawing. Filed Mar. 28, 1967, Ser. No. 626,380
Int. Cl. C08g 20/12, 51/48, 51/50
U.S. Cl. 260—30.6                             7 Claims

ABSTRACT OF THE DISCLOSURE

The concurrent use of a plasticizer and a nucleating agent significantly promotes the crystallinity of synthetic linear polyamides on cooling such polymers from the molten to the solid state.

---

This invention relates to the use of a plasticizer in conjunction with a nucleating agent to significantly increase the effectiveness of the latter in promoting the crystallinity of synthetic linear polyamides.

X-ray diffraction studies of synthetic linear polyamides such as nylon 6 have shown that they may exist in one or more of several different crystalline forms. Structures which have been recognized include, in the case of nylon 6, the amorphous form, the pseudo hexagonal gamma-form, and the monoclinic alpha form.

The amorphous form of nylon 6 is obtained by rapid quenching of molten polymer to a temperature below the glass transition temperature of the nylon. Both the amorphous and gamma-forms are relatively unstable upon application of heat and moisture. Heating amorphous material to a temperature between approximately 55° C. and 150° C. results in at least a partial conversion of the amorphous form into the gamma-form. At temperatures above 150° C., a transition of the gamma- into the alpha-form occurs. This monoclinic alpha structure represents a highly ordered crystalline form that is stable at temperatures up to the melting point of the nylon 6. It is the most desirable crystalline form from the standpoint of obtaining the optimum physical properties with nylon 6, including mold shrinkage and maximum dimensional stability.

The "super" or morphological structure in which the crystalline units are arranged also affects the physical properties of nylons. The crystalline units are arranged in polycrystalline aggregates known as spherulites. These spherulites may be detected by microscopic examination under polarized light. They are characterized by a more or less symmetrical growth in all directions from a nucleus and are composite structures made up of crystalline and amorphous regions. The number and size of the spherulites determines the texture of graininess in the bulk of the material and influences optical as well as physical properties. Physical properties improve with increasing homogeneity and fineness of the spherulitic structure throughout the bulk of the material.

To obtain optimum physical properties in articles fabricated from nylon 6, it is desirable, therefore, to produce a highly crystalline material, crystallized predominantly in the stable alpha-form, with an extremely fine, dense and uniform morphological structure.

Among the physical properties affected by increased crystallinity and improved morphological structure are abrasion resistance, heat distortion temperature, inherent stability or resistance to deformation, resistance to hot water, coefficient of expansion, hardness, tensile yield strength and surface hardness.

Customary fabricating procedures used with nylon 6 such as injection molding, which include a rapid cooling from the melt, generally result in articles which contain the different crystalline structural forms to a varying degree depending upon the thermal history of the article.

It is known that a greater degree of crystallinity is obtained when polyamides are cooled extremely slowly from the melt; however, under these conditions, large spherulites develop, moreover the process is not economical. Crystallinity and the uniformity of the morphological structure can also be increased by annealing treatments after solidification. However, such practices are not economically feasible in ordinary industrial fabricating procedures as, for example, injection molding. More recently, investigators have found that bodies shaped from polyamides having a homogeneous and fine spherulitic structure can be obtained by addition to the polyamide melt of finely divided solids which act as crystallization nuclei. (e.g. U.S. Pats. 2,855,377, 3,261,800 and 3,080,345; Belgian Pat. 674,170).

The function of nucleating agents when cooling semi-crystalline polymers from the molten into the solid form is to increase the number of nuclei formed in a given time interval at a predetermined temperature The final and over-all crystallinity, however, depends not only on the number of nuclei that are formed but also on the spherulitic growth rate from such nuclei. As noted above, spherulites develop with respect to a center, or nucleus, of growth. Addition of the nucleating agents thus provides a large number of sites for growth upon cooling from a melt. In order to be of practical use, such nucleating agents not only must produce a fine spherulitic structure but also must do this under conditions of rapid cooling to a temperature above the glass transition temperature of the polyamide, i.e., they must reduce the time that is necessary under a given set of conditions for crystallization to start. This time is usually referred to as "induction time." Subsequent growth from the spherulitic center depends on the polymer chain mobility. Thus, a factor in the spherulitic growth rate is the macroscopic viscosity of the polymer and its temperature dependence. All segmental motion is "frozen in" at the glass transition temperature (Tg) and no additional crystallization occurs even when nuclei are present. This Tg is about 50° C. in nylon 6.

It is a primary object of this invention to provide a means for significantly increasing the effectiveness of nucleating agents for linear polyamides in terms of the rate of crystallization into the desirable crystalline form.

It is a further object of this invention to provide a means for significantly increasing the effectiveness of nucleating agents for nylon 6 in terms of the overall rate of crystallization.

It is a still further object of this invention to provide a means for improving the fineness and homogeneity of the crystalline structure obtained on cooling nylon 6 into solid form from a melt. Further objects and advantages will become apparent from the description of the invention which follows in greater detail.

It has now been found in accordance with this invention that the effectiveness of nucleating agents for synthetic linear polyamides may be significantly increased by using a plasticizer in conjunction with the nucleating agent.

What this invention comprises therefore is a process for improving the crystalline structure of synthetic linear polyamide compositions by homogeneously dispersing in the polyamide a mixture of a nucleating agent and a plasticizer and thereafter hot-forming the polyamide. Suitable forming techniques include extrusion, injection molding, rotational casting, and the like.

In carrying out the process of this invention, the nucleating agent may be added to the nylon resin at any convenient time prior to the solidification of the shaped article from the molten nylon. Thus, for example, the nucleating agent in the form of a powder may be distributed over the surfaces of nylon molding granules prior to feeding the granules into an extruder or other forming device. This distribution of the nucleating particles may also be accomplished by adding the powdered nucleating agent to the nylon granules and tumbling. Equally well, the powder, in suspension in a low-boiling liquid, such as a petroleum ether or an alcohol, may be sprayed over the surfaces of the nylon granules and the solvent evaporated. If desired, a small amount of a binding agent may be incorporated into the low-boiling solvent or added with the powdered nucleating agent to prevent dusting and to bind the powder to the surfaces of the nylon granules.

Another method of adding the nucleating agent is to mix the powdered nucleating agent with the molten nylon resin prior to preparation of the molding granules. In some cases, the nucleating agent may be added during or prior to the polymerization of the polyamide. Equally well, the nucleating agent may be added to a solution of the polyamide in a polar solvent at elevated temperature and the polymer then precipitated by cooling. Still another method of introducing finely divided nucleating agent is to add to molten polyamide a nucleating agent which dissolves in the molten polyamide above its melting point and then precipitates out as an extremely fine dispersion at a temperature not lower than 35° C. below the crystalline melting point of the polyamide.

The nucleating agents with which this invention is concerned cannot be classified chemically since their activity is not chemical in the traditional sense, which would involve molecular reactivity and the formation of new chemical compounds. Rather, the nucleating agents with which this invention is concerned belong to a physical class, since their effect is primarily a physical, rather than a chemical, phenomenon.

It has been discovered that any sufficiently finely divided material having a maximum dimension of $1\mu$, or less, which is solid at temperatures from the melting temperature of the nylon to about 35° C. below this temperature, which tends to disperse rather than agglomerate in molten nylon and which provides polar surfaces which adsorb, and hence orient, some of the amide groups of the polyamide chains, will provide the nucleation sites required for the initiation of spherulitic growth during the solidification of nylons. Thus, inorganic salts and metal oxides which adsorb amide groups at elevated temperatures show nucleation activity, if sufficiently finely divided and not agglomerated. The presence of a stable organic substituent such as a hydrocarbon group in an inorganic salt tends to improve the affinity of the salt for the molten nylon and hence prevent agglomeration and improve the dispersion of the finely divided solid salt. Thus finely divided sodium phenylphosphinate or sodium isobutylphosphinate are preferred nucleating agents; other excellent and preferred nucleating agents include such materials as finely divided silver halides, alkaline earth oxides, and very fine silicas and aluminas. Compounds which actually dissolve in hot, molten nylons at temperatures above their melting points, but which precipitate out in an extremely fine state near the melting point of the polyamide, are likewise effective nucleating agents. Such materials include mercuric halides, divalent metal acetates, and high molecular weight, aromatic, polar compounds such as phenolphthalein. Other suitable nucleating agents include, for example, molybdenum disulfite, boron nitride, metal complexes of phthalocyanine, talcum, and the like. The quantity of nucleating agent used, although varying somewhat depending upon the purposes and the nylon being used, should be from about 0.25% to about 5%.

The plasticizer, which may be either a liquid or a solid at room temperature, may, even as the nucleating agent, be added to the nylon at any time prior to the final solidification of the nylon either in conjunction with the nucleating agent or in a separate step. If desired, the nucleating agent may be dispersed in the plasticizer and the dispersion added to the nylon. Generally, an approximately equivalent amount of plasticizer and nucleating agent are added, although up to about 20% by weight of plasticizer may advantageously be added in some instances.

Non-limiting examples of suitable plasticizers include, for example, triethylene glycol, 2-ethyl-1,3-hexanediol, cresyldiphenyl phosphate, tricresyl phosphate, triphenyl phosphate, polysulfonamidoformaldehyde, ethanol-formamide, stearamide, lauramide, benzamide and salicylamide, tetrabutyl adipamide, tetrabutyl phthalamide, bisethanol adipamide, bis(diethanol)-adipamide, bis-ethanol diglycolamide, acetanilide, N-diphenyl lauramide, aceto-acetanilide, the diacetyl derivative of ethanol amine, the tripropionyl derivative of diethanolamine, p-toluene sulfonamide, N-alkyl- or aryl-toluene sulfonamides such as N-ethyl ortho and para-toluene sulfonamide, N-butyl-p-toluene sulfonamide, a mixture of N-butyl-o- and p-toluene sulfonamides, N-diamyl-p-toluene sulfonamide and N-dibutyl-p-toluene sulfonamide, N-benzoyl-p-toluene sulfonamide, cyclohexane sulfonamide, cyclohexane, 1,4-disulfonamide, N-isobutyl cyclohexane sulfonamide, N-phenyl cyclohexane sulfonamide, N-(2-ethylhexyl) cyclohexane sulfonamide, N-dimethyl cyclohexane sulfonamide, N-ethyl sulfonamide, N-butyl-benzene sulfonamide, naphthalene sulfonamide, and N-ethyl naphthalene sulfonamide.

The reference can be more fully understood by reference to the following examples. All parts are parts by weight unless otherwise expressly noted.

EXAMPLE 1

The increased effectiveness of a combination of nucleating agent and plasticizer in promoting the formation of the $\alpha$-form of nylon 6, as compared with nucleating agent alone, is shown below. Plasticizer alone has essentially no effect on crystalline structure. Samples of a standard nylon 6 resin having a number average molecular weight of 20,000 as determined by end group analysis, were blended respectively with 1.0 wt. percent plasticizer (mixed N-ethyl-o and p-toluene sulfonamide), 1% of a nucleating agent (sodium phenylphosphinate) and with 1.0% of a 50/50 physical mixture of the plasticizer and the nucleating agent. The blends so obtained were then injection molded using a 0.5 minute molding cycle at 50° C., 135° C. and 155° C. with the following results:

| | Percent $\alpha$-phase content | | |
|---|---|---|---|
| | 50° C. | 135° C. | 155° C. |
| Additive: | | | |
| None | 0 | 13 | 28 |
| A | 0 | 12 | 29 |
| B | 12 | 37 | 48 |
| C | 9 | 51 | 54 |

NOTE.—A=1% mixed N-ethyl-o- and p-toluene sulfonamide (plasticizer); B=1% mixed sodium phenylphosphinate (nucleating agent); C=1% mixed N-ethyl-o and p-toluene sulfonamide-Sodium phenylphosphinate 50/50.

EXAMPLE 2

The effect of the combination of plasticizer and nucleating agent on certain other physical properties of nylon 6 is shown below:

THE EFFECT OF A COMBINATION OF A PLASTICIZER WITH A NUCLEATING AGENT ON PHYSICAL PROPERTIES OF NYLON 6
[Sodium phenylphosphinate and N-ethyl-o and p-toluene sulfonamide]
Mold temperature 135° C. Cycle time 0.5 min.

| | Additive | | | |
|---|---|---|---|---|
| Properties | None | A | B | C |
| 2% secant modulus (p.s.i.) | 101,200 | 108,970 | 126,200 | 128,000 |
| Yield strength (p.s.i.) | 9,950 | 8,880 | 10,600 | 11,080 |
| Yield elongation (1%) | 12.1 | 11.4 | 10.2 | 12.0 |
| Ultimate tensile strength (p.s.i.) | 11,050 | 10,330 | 9,440 | 10,520 |
| Percent alpha phase | 13 | 12 | 37 | 51 |
| Ultimate elongation (1%) | 310 | 310 | 230 | 280 |

NOTE.—A=1% mixed N-ethyl-o and p-toluene sulfonamide (plasticizer) B=1% mixed sodium phenylphosphinate (nucleating agent); C=1% N-ethyl-o and p-toluene sulfonamide-sodium phenyl-phosphinate 50/50.

EXAMPLE 3

The following combinations of nucleating agents (1 wt. percent) and plasticizers (1 wt. percent) are found to be more effective than the same total concentration (2.0%) of the corresponding nucleating agent alone in promoting the formation of the α-form of nylon 6 using a rotational casting apparatus at 70° C.

| Nucleating Agent | Plasticizer |
| --- | --- |
| Sodium phenylphosphinate | Triethylene glycol. |
| Do | Tricresyl phosphate. |
| Do | 2-ethyl-1,3-hexane diol. |
| Molybdenum disulfide | N-ethyl-o-toluene sulfonamide. |
| Do | N-ethyl-p-toluene sulfonamide. |
| Sodium isobutyl phosphinate | N-ethyl-o and p-toluene sulfonamide |
| Silver bromide | Do. |
| Boron nitride | Do. |
| Talcum | Do. |
| Sodium phthalocyanine | Do. |

EXAMPLE 4

The crystallinity of the following synthetic linear polyamides is also enhanced to a greater extent by an equal parts by weight combination of molybdenum disulfide and 2-ethyl-1,3-hexane diol as compared to the same total concentration (1.5%) of molybdenum disulfide alone on processing in an extrusion apparatus at 110° C.

Nylon 66
Nylon 10
Nylon 12
Nylon 610

Various modifications will be apparent to one skilled in the art and it is not intended that this invention be limited to the details in the specific examples presented by way of illustration. Accordingly, the scope of the invention is limited only by the appended claims.

We claim:

1. A solid synthetic linear polyamide composition having enhanced crystalline uniformity, said polyamide composition having substantially homogeneously dispersed therein from about 0.10 to about 5.0 weight percent of a finely divided nucleating agent selected from the group consisting of sodium phenylphosphinate, sodium isobutylphosphinate, silver bromide, molybdenum disulfide, boron nitride, the sodium complex of phthalocyanine, and talcum; and from about 0.25 to about 20.0 weight percent of a plasticizing agent selected from the group consisting of triethylene glycol, 2-ethyl-1,3-hexane-diol, tricresylphosphate, N-ethyl-o- and p-toluene sulfonamide, and a mixture of N-ethyl-o- and p-toluene sulfonamide.

2. A composition in accordance with claim 1 wherein said nucleating agent is sodium phenylphosphinate and said plasticizer is N-ethyl mixed o- and p-toluene sulfonamide.

3. A composition in accordance with claim 1 wherein said polyamide is poly-ε-caprolactam.

4. A process for the manufacture of poly-ε-caprolactam having a homogeneous, uniform, finely crystalline and continuous morphological structure with a minimum of internal stresses, which comprises (a) forming a substantially homogeneous mixture of said poly-ε-caprolactam with from 0.10 to 5.0 weight percent of a finely divided nucleating agent selected from the group consisting of sodium phenylphosphinate, sodium isobutylphosphinate, silver bromide, molybdenum disulfide, boron nitride, talcum, and sodium complexes of phthalocyanine, and (b) from 0.5 to 10.0 weight percent of a plasticizing agent selected from the group consisting of triethylene glycol, 2-ethyl-1,3-hexanediol, tricresyl phosphate, N-ethyl-o-toluene sulfonamide, N-ethyl-p-toluene sulfonamide, and a mixture of N-ethyl o- and p-toluene sulfonamide; (c) melting said mixture; and (d) cooling said mixture to a temperature below its melting point.

5. A process in accordance with claim 4 wherein said nucleating agent is sodium phenyl phosphinate and wherein said plasticizing agent is a mixture of N-ethyl-o- and p-toluene sulfonamide.

6. A process in accordance with claim 5 wherein said melting and said cooling is carried out in an injection molding, extrusion and rotational casting apparatus.

7. A process in accordance with claim 5 wherein the formation of said substantially homogeneous mixture is effectuated by dispersing said sodium phenyl phosphinate in said mixed N-ethyl-o- and p-toluene sulfonamide, spraying said dispersion on the surface of ε-caprolactam which is in granular form and tumbling said sprayed granules.

References Cited

UNITED STATES PATENTS

| | | | |
| --- | --- | --- | --- |
| 2,816,875 | 12/1957 | Beindorff | 260—32.6N |
| 2,927,906 | 3/1960 | Schlack | 260—30.8 |
| 3,361,701 | 1/1968 | Polack et al. | 260—32.6N |
| 3,368,992 | 2/1968 | Altermatt | 260—32.6N |
| 3,371,055 | 2/1968 | Illing et al. | 260—32.6N |
| 3,404,117 | 10/1968 | Offner | 260—30.2 |
| 3,156,665 | 11/1964 | Brossman et al. | 260—37N |
| 3,261,800 | 7/1966 | Dale | 260—37N |
| 3,080,345 | 3/1963 | Brooks et al. | 260—78 |
| 3,214,414 | 10/1965 | Waltersperger | 260—37N |

ALLAN LIEBERMAN, Primary Examiner

U.S. Cl. X.R.

260—30.8, 32.6, 33.4, 37, 78